(12) United States Patent
Digirolamo et al.

(10) Patent No.: US 11,839,227 B2
(45) Date of Patent: *Dec. 12, 2023

(54) SWEETENER COMPOSITION

(71) Applicant: Hapy Sweet Bee Ltd, Cheshire (GB)

(72) Inventors: Laura Digirolamo, London (GB); Marvin J. Rudolph, Sharon, MA (US)

(73) Assignee: Hapy Sweet Bee Ltd, Cheshire (GB)

( * ) Notice: Subject to any disclaimer, the term of this patent is extended or adjusted under 35 U.S.C. 154(b) by 442 days.

This patent is subject to a terminal disclaimer.

(21) Appl. No.: 16/687,025

(22) Filed: Nov. 18, 2019

(65) Prior Publication Data
US 2021/0145033 A1  May 20, 2021

(51) Int. Cl.
*A23L 27/30* (2016.01)
*A23L 2/60* (2006.01)

(52) U.S. Cl.
CPC ............... *A23L 27/36* (2016.08); *A23L 2/60* (2013.01); *A23L 27/34* (2016.08); *A23V 2002/00* (2013.01)

(58) Field of Classification Search
CPC . A23L 27/36; A23L 27/34; A23L 2/60; A23V 2002/00
USPC ...................................................... 426/548
See application file for complete search history.

(56) References Cited

U.S. PATENT DOCUMENTS

| | | | |
|---|---|---|---|
| 9,408,406 B2* | 8/2016 | Dierbach | A23L 27/33 |
| 2013/0040036 A1 | 2/2013 | Zeller et al. | |
| 2013/0209658 A1* | 8/2013 | Spelman | A23L 27/36 |
| | | | 426/658 |
| 2013/0236597 A1 | 9/2013 | Dierbach et al. | |
| 2013/0316066 A1 | 11/2013 | Brown et al. | |
| 2014/0342043 A1 | 11/2014 | Bell et al. | |
| 2014/0342046 A1 | 11/2014 | Ackilli et al. | |
| 2015/0327584 A1* | 11/2015 | Shi | A23L 27/36 |
| | | | 426/456 |
| 2017/0055555 A1 | 3/2017 | Skiff et al. | |
| 2017/0119032 A1 | 5/2017 | Patron et al. | |
| 2017/0247647 A1 | 8/2017 | Lee et al. | |

OTHER PUBLICATIONS

Prakash et al. (Development of Next Generation Stevia Sweetener: Rebaudioside M. Foods, Mar. 2014; 3(1), pp. 162-175) (Year: 2014).*
Non-Final Office Action dated Feb. 3, 2021, issued in related U.S. Appl. No. 17/097,627 (15 pages).

* cited by examiner

*Primary Examiner* — Brent T O'Hern

(74) *Attorney, Agent, or Firm* — Sheppard Mullin Richter & Hampton LLP

(57) ABSTRACT

The present invention relates to a sweetener composition comprising rebaudioside-M and 1,3-propanediol which may be used in foods or beverages. The composition may also comprise one or more flavourings and/or one or more additives.

15 Claims, No Drawings

SWEETENER COMPOSITION

FIELD OF INVENTION

The present disclosure relates generally to liquid sweetener compositions and more particularly to natural liquid sweetener compositions comprising steviol glycosides.

BACKGROUND

Sugar and sweetener products are commercially available for a range of applications but find most widespread adoption in the food and beverage industry to impart a sweet taste to beverages and foodstuffs. Many consumers believe a sweet taste to be desirable in products such as desserts and hot beverages but other products such as canned goods, dairy products and some medicines may also have added sugars and/or sweeteners to enhance their sweetness or to disguise a bitter or otherwise unwanted taste.

Sucrose is the standard for sweetness by which other sweeteners are measured. Many sweeteners, such as the artificial sweetener saccharin, are significantly sweeter than sucrose at equivalent concentrations and so a reduced concentration of saccharin would be required to impart the same level of sweetness to a beverage or foodstuff as a greater concentration of sucrose. Sucrose is highly calorific, and the reduction in the amount of sweetener required means that significantly fewer calories may be available to the body from the ingested food or beverage containing the sweet flavour. The reduction in the amount of sweetener required may result in the sweetener component being rated as low or zero calorie.

There is widespread consumer skepticism as to the healthiness of artificial and synthetic sweetener products for human consumption with many consumers expressing a preference for natural or naturally derived products. Steviol glycosides are one group of natural sweeteners with a sweetness index in excess of 100. However, we have appreciated that many common steviol glycosides impart a bitter aftertaste. The present inventors have been working to identify new and effective natural sweeteners with a sweetness index in considerable excess of that of sucrose such that the sweetener may provide minimal additional calorific content to a food or beverage to which it is added without a bitter aftertaste.

SUMMARY OF THE INVENTION

The present invention provides a natural liquid sweetener composition and methods of preparing the same.

According to one aspect of the invention there is provided a composition comprising rebaudioside-M (reb-M) and 1,3-propanediol. The composition is, for example, in the form of a liquid sweetener.

In one aspect of the invention, the composition is preferably non-aqueous.

In another aspect of the invention, the composition is preferably free of propylene glycol.

In another aspect of the invention, the composition is preferably free of artificial or natural preservatives.

In another aspect of the invention, the composition is preferably calorie-free, that is, the composition suitably provides less than 4 calories (kcal) per 100 ml of the composition.

In another aspect, the composition is preferably a natural liquid sweetener composition, that is, nothing artificial or synthetic, including all colour additives, has been included in the composition.

The composition may be used as a sweetener for food and beverages. The composition may also comprise one or more flavourings. The flavouring, where present, may for example be selected from the group comprising white sugar flavouring, brown sugar flavouring, cane sugar flavouring, beet sugar flavouring, or any combination thereof. The composition may comprise one or more further steviol glycosides in addition to reb-M. Alternatively, the composition may be substantially free of steviol glycosides other than rebaudioside-M. The composition may also be substantially free of water and/or propylene glycol. The composition may comprise glycerol. The composition may comprise 25% to 99.5% 1,3-propanediol and 0.5% to 75% rebaudioside-M, by total weight of the composition. The composition may comprise 25 to 85% 1,3-propanediol, 5 to 35% rebaudioside-M, and 10 to 40% flavouring. The composition may comprise glycerol. The composition may comprise 25% to 99.5% 1,3-propanediol and 0.5% to 75% rebaudioside-M, by total weight of the composition. The composition may comprise 25 to 85% 1,3-propanediol, 5 to 35% rebaudioside-M, and 10 to 40% flavouring.

According to another aspect of the invention, there is provided a process for the preparation of a composition, the process comprising: adding rebaudioside-M to 1,3-propanediol to form a mixture; heating the mixture of rebaudioside-M to 1,3-propanediol to form a solution of rebaudioside-M; and cooling the solution of rebaudioside-M.

The process may comprise adding one or more flavourings to the solution of rebaudioside-M. The process may further comprise mixing the solution of rebaudioside-M and the flavouring, where present. The process may comprise adding one or more flavourings of to the solution of rebaudioside-M after the solution of rebaudioside-M has cooled. The process may comprise heating the mixture of rebaudioside-M to a temperature of 40° C. to 120° C.

DETAILED DESCRIPTION

A sweetener is any substance with a sweet taste which may impart, improve or enhance the sweetness of another product. Carbohydrates produced from the refinement of beets or cane are the most common sweetener due to their solubility, granularity and distinctive flavour profile. Carbohydrates and other sweeteners including corn-derived syrups and fructose-based syrups such as honey are not only known to promote sweetness but also to suppress undesirable bitter tastes. Consequently, sweeteners have found use in the food industry in addition to medicines and health and beauty applications where otherwise bitter substances for ingestion are disguised by the use of a sweet bitterness suppressor.

Assessments of sweetness are measured relative to the sweetness of sucrose which has been adopted as the baseline measurement of sweetness with a sweetness index of 1.0. Some carbohydrates may exhibit a greater sweetness index which indicates a more sweet taste than the baseline sucrose. Alternatively, other carbohydrates may exhibit a reduced sweetness index which indicates a less sweet taste than sucrose. For example, fructose has a sweetness index of approximately 1.7 indicating that it is 1.7 times sweeter than sucrose. Glucose has a sweetness index of approximately 0.75 indicating that it is 25% less sweet than sucrose. Carbohydrates are typically calorific, i.e. they impart an amount of dietary energy per mass consumed. Recently, health concerns relating to consumption of carbohydrates and diets high in calories have led to increased interest and demand for sweeteners that can impart a high level of sweetness without the use of a calorific quantity of sweetening agent.

The discovery of artificial sweeteners with sweetness indices considerably in excess of that of sucrose allowed for the sweetening of food and beverages with the addition of minimal calories. For example, the artificial sweetener saccharin has a sweetness index of approximately 300 to 400 indicating that it is 300 to 400 times sweeter than sucrose. For example, 1 gram of saccharin would impart the equivalent sweetness of approximately 300 to 400 grams of sucrose if mixed into beverages of identical volume. The capability to sweeten a food or beverage with the additional of only small quantities of sweetener drove a market for products that impart a sweet taste with minimal calorie intake. Sweeteners that add fewer than 5 calories per product serving size, commonly called 'high intensity sweeteners' are deemed by the US FDA to provide negligible calorific effect upon the body and so are typically labelled as 'zero calorie' sweeteners. Under European guidance, a sweetener must contribute less than 4 calories (kcal) per 100 ml of a product serving to be described as a 'calorie free' or 'zero calorie' sweetener.

The commercialisation of saccharin in the 1950s saw the first widespread use of artificial sweeteners in the food and beverages industry. However, in the 1960s, concerns were raised regarding the impact of artificial sweeteners upon human health. Although many of the concerns regarding artificial sweeteners have been since disproven, there remains widespread consumer skepticism in relation to artificial and synthetic sweetener products for human consumption with many consumers expressing a preference for natural or naturally derived products. According to the UK Food Standards Agency, natural sweeteners are defined as those comprised of natural ingredients, e.g. ingredients produced by nature, not the work of man or interfered with by man. Although the US FDA has not yet formally defined the term 'natural', guidance issued alongside a recent public consultation indicated that the FDA may consider the term 'natural sweetener' to mean that that nothing artificial or synthetic, including all colour additives regardless of source, has been included in, or has been added to, the sweetener that would not normally be expected to be in that sweetener.

Steviol glycosides are one examples of a group of natural sweeteners. Steviol sweeteners were originally derived from the leaf of the *Stevia Rebaudiana* plant which is native to South America. The stevia leaf derives its sweetness from a number of compounds known as rebaudiosides which are present to different extents in different parts of the stevia leaf. Rebaudioside A, commonly known as reb-A, is the most common steviol glycoside and has a sweetness which is approximately 200 times sweeter than sucrose sugar. Reb-A has been used commercially due to its high abundance in the stevia leaf and its relative ease of extraction. The chemical structure of reb-A is shown in Structure 1. Other rebaudiosides including rebaudioside-B, rebaudioside-C, rebaudioside-D, rebaudioside-E and rebaudioside-F have been extracted in smaller quantities from the stevia plant.

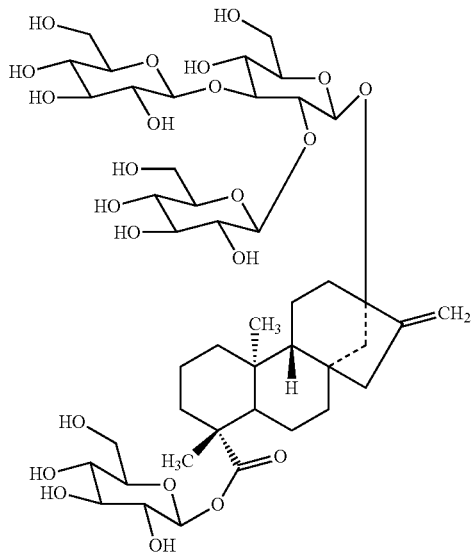

Structure 1

Chemical structure of rebaudioside A

Many steviol glycoside sweeteners, including reb-A, are known to impart a bitter aftertaste on the palate which lingers beyond the sweet flavour they are primarily used to provide. The inventors of the present invention have recognised that bitterness is typically undesirable in a sweetener and a sweetener formulation with the benefits of a high sweetness index but without the associated bitter aftertaste would be preferable.

The present inventors have appreciated that another steviol glycoside, rebaudioside-M (reb-M), possesses a sweetness index of from 200 to 350 and that reb-M, at least when used alone or substantially alone, imparts a reduced bitterness of aftertaste when compared to many of the established rebaudioside sweeteners including reb-A. The chemical structure of reb-M is shown in Structure 2. However, we have found that the use of reb-M poses several challenges which prevent its ease of exploitation as a sweetener, notably its low solubility and its low concentration in the stevia leaf. Rebaudioside-M is generally insoluble in water at room temperature and has a solubility of up to 0.1 g per 100 ml water. The poor solubility of reb-M makes its use challenging and to date there are no reports of the successful use of reb-M as the principal sweetener in any kind of liquid sweetener. Moreover, reb-M is only found in proximity to the tips of the stevia leaf which makes extraction and utilisation of pure reb-M sweeteners from the stevia leaf difficult in practice.

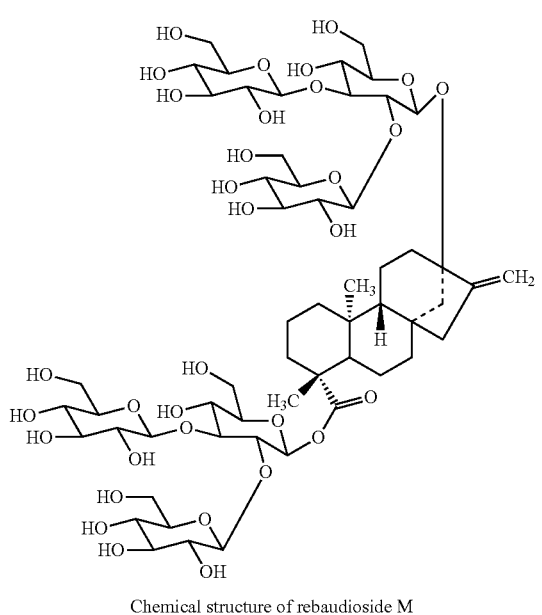

Structure 2

Chemical structure of rebaudioside M

Notwithstanding, the present inventors have now devised a way to overcome the aforementioned challenges, and have provided a stable formulation which is a liquid sweetener composition comprising reb-M as an active sweetening agent, without the need to use preservatives and other such products typically found in liquid sweetener compositions. The formulation may be a "natural" product, can be essentially calorie-free, and may be free of preservatives. In a particular aspect, it does not require the use of propylene glycol, or the use of water, and this provides significant advantages.

A liquid sweetener composition is preferable to a solid composition comprising reb-M as a liquid sweetener composition, and may, for example, be uniformly mixed or dispersed throughout a food or beverage. In contrast, a solid composition would prove challenging to disperse in, for example, a beverage due to the poor solubility of reb-M in many liquid media. Reb-M is advantageous in a liquid sweetener as it possesses a high sweetness index and a low bitterness profile. Natural reb-M may, for example, be obtained by extracting steviol glycosides from the stevia plant or as a product of the natural fermentation of sugar cane by yeast. Reb-M produced by natural fermentation is commercially available from Amyris™ based in California.

The active sweetener component in the sweetener composition of the invention may comprise rebaudioside-M and optionally one or more additional active sweetener components, but we prefer to use reb-M alone or in substantial excess of any other sweetener components, where present. One or more of the additional active sweetener components, where present, may each be an artificial sweetener, a synthetic sweetener or a natural sweetener product. The one or more additional active sweetener components may be selected from acesulfame K, advantame, agave syrup, alitame, aspartame, aspartame-acesulfame salts, barley malt syrup, birch syrup, blackstrap molasses, brazzein, brown rice syrup, cane juice, caramel, coconut palm sugar, corn sugar, corn sweetener, corn syrup, curculin, cyclamate, dextrose, douxmatok sugar, erythritol, fructooligosaccharide, fructose glucose syrup, fructose, galactose, glucitoll, glucose, glucose fructose syrup, glycerol, glycyrrhizin, golden syrup, high fructose corn syrup, HFCS-42, HFCS-55, HFCS-90, high maltose corn syrup, honey, hydrogenated starch hydrolysate, isomalto-oligosaccharide isoglucose, inulin, inverted sugar, isomalt, lactitol, lactose, levulose, luo han guo, maltitol, maltodextrin, maltose, mannitol, maple syrup, miraculin, molasses, monatin, monellin, monk fruit, neohesperidin DC, neotame, oligofructose, palm sugar, pentadin, polydextrose, rapadura, rebaudiosides, rebaudioside-A, rebaudioside-B, rebaudioside-C, rebaudioside-D, rebaudioside-E and rebaudioside-F refiners syrup, saccharin, saccharose, sorbitol, sorghum syrup, stevia, steviol glycosides, stevioside, sucralose, sucrose, thaumatin, trehalose, xylitol, yacon syrup, and any other suitable natural or artificial sweetener. In one aspect, the active sweetener component of the composition may consist wholly of reb-M, or at least 75% or more, or 90% or more, preferably 95% or more reb-M by weight of the sweetener component, preferably 99% by weight or more of the sweetener component. In another example, the active sweetener component may comprise 50% reb-M and 50% of another steviol glycoside, for example reb-A, by weight of the active sweetener component. In yet another example, the quantity of reb-M in the active sweetener component may be greater than the quantity of the one or more additional active sweetener components.

The active sweetener component may be present in the sweetener composition in an amount of from 0.1 to 75% by total weight of the sweetener composition. In an example, active sweetener ingredient may be present in the composition in a proportion of from 0.1 and 65% by total weight of the composition. In another example, the active sweetener ingredient may be present in the composition in a proportion of from 0.1 to 55% by total weight of the composition. In yet another example, the active sweetener ingredient may be present in the composition in a proportion of from 0.1 to 45% by total weight of the composition. In a further example, the active sweetener ingredient may be present in the composition in a proportion of from 0.1 to 35% by total weight of the composition. In a yet further example, the active sweetener ingredient may be present in the composition in a proportion of from 5 to 75% by total weight of the composition. In an additional example, the active sweetener ingredient may be present in the composition in a proportion of from 10 to 75% by total weight of the composition. In a further additional example, the active sweetener ingredient may be present in the composition in a proportion of from 2 to 20% by total weight of the composition. In yet another additional example, the active sweetener ingredient may be present in the composition in a proportion of from 4 to 15% by total weight of the composition. In a yet further additional example, the active sweetener ingredient may be present in the composition in a proportion of from 5 to 10% by total weight of the composition.

Propylene glycol, or 1,2-propanediol as it is also known, has been used extensively in existing sweetener formulations due to the ease of solubility of many sweeteners in propylene glycol combined with its low price and widespread commercial availability. The structure of propylene glycol is shown in structure 3. Commercial production of propylene glycol is performed using high temperature and pressure synthetic methods involving the hydrolysis of propylene oxide. The method by which propylene glycol is manufactured is a synthetic method and propylene glycol on the commercial scale is not a natural product. The inclusion of propylene glycol in food or beverage products may therefore deter customers from consuming any product containing the compound. Propylene glycol has also been historically linked to health concerns, although is still widely used and accepted in the food and beverage industry. We have appreciated that an alternative solvent or liquid base could thus be advantageous.

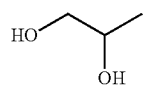

Structure 3

1,2-propanediol (propylene glycol)

Propylene glycol is typically used as a solubility enhancer in many existing sweetener formulations and sweeteners may be dissolved in propylene glycol at room temperature without special preparative processes or the use of solubility enhancing agents. In view of these properties, propylene glycol is deemed by many to be the solvent of choice for food and beverage applications.

We have found that, surprisingly, rebaudioside-M may be dissolved in 1,3-propanediol by heating, for example, a mixture of reb-M powder and 1,3-propanediol even in the absence of propylene glycol, solubility enhancers or additional solvents. Still more surprisingly, it has been discovered that reb-M is retained in the solution of 1,3-propanediol once the solution has been cooled back to room temperature, and provides a highly stable solution with excellent shelf life.

The solvent or liquid base for the sweetener composition may comprise 1,3-propanediol and optionally one or more additional solvents. The solubility of reb-M has been surprisingly found to be approximately 795 g/l (approximately 70 to 80% by weight) when a solvent of 1,3-propanediol is heated in excess of 80° C. (175° F.) and cooled to room temperature. Advantageously, the reb-M is retained in solution when the heated solution is cooled to a temperature of approximately 2° C. (36° F.).

1,3-propanediol can be synthetically manufactured using hydroformylation/hydrogenation processes but may also be produced via natural fermentation methods using feedstocks such as corn starch. It may, for example, be obtained commercially as Zemea™ from Dupont Tate & Lyle. 1,3-propanediol has several advantageous characteristics including antimicrobial properties and suppression of bitterness of some sweeteners. The structure of 1,3-propanediol is provided in structure 4.

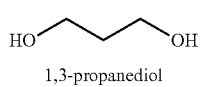

Structure 4

1,3-propanediol 1,3-propanediol has a lower minimum inhibitory concentration (MIC) than other solvents such as glycerin which is commonly used to lower the water activity of a solvent system to prevent microbial growth. The compositions of the present disclosure may therefore achieve a reduced bacterial and fungal count at a higher water activity, where water is present, when compared to formulations comprising glycerin. A reduction in microbial activity may result in enhanced composition stability and a greater shelf life.

The solvent or liquid base may be present in the sweetener composition in a proportion of from 25 to 99% by total weight of the composition. In an example, the solvent may be present in the composition in a proportion of from 25 to 90% by total weight of the composition. In another example, the solvent may be present in the composition in a proportion of from 25 to 80% by total weight of the composition. In yet another example, the solvent may be present in the composition in a proportion of from 25 to 70% by total weight of the composition. In a further example, the solvent may be present in the composition in a proportion of from 25 to 60% by total weight of the composition. In a yet further example, the solvent may be present in the composition in a proportion of from 35 to 99% by total weight of the composition. In an additional example, the solvent may be present in the composition in a proportion of from 45 to 90% by total weight of the composition. In a further additional example, the solvent may be present in the composition in a proportion of from 55 to 90% by total weight of the composition. In yet another additional example, the solvent may be present in the composition in a proportion of from 35 to 80% by total weight of the composition. In a yet further additional example, the solvent may be present in the composition in a proportion of from 40 to 75% by total weight of the composition.

The solvent or liquid base may comprise 1,3-propanediol and optionally one or more additional solvents. Preferably, the solvent comprises at least 90%, or 95%, 1,3-propanediol by weight of the solvent, and more preferably the solvent comprises, or consists of, only 1,3-propanediol. The one or more additional solvents may be selected from water; propylene glycol, ethanol, glycerol, propylene carbonate, and any other suitable food grade solvent that may be safely ingested. In an example, the solvent consists of 1,3-propanediol. In another example, the solvent comprises 1,3-propanediol and glycerol. In yet another example, the solvent comprises 1,3-propanediol and water. In a yet further example, the solvent may comprise 1,3-propanediol, glycerol and water. In one advantageous example, the solvent may be substantially free of water. A solvent that is substantially free of water may comprise up to 0%, 1%, 2%, 3%, 4% or 5% by weight of water. Preferably, the solvent comprises no water. The presence of water in the solvent may promote bacterial or microbial growth which in turn may limit the long term stability and shelf life of the sweetener composition. Moreover, the presence of water may reduce the solubility of reb-M in solution and so the proportion of water present in the solvent must be sufficiently low such that the desired concentration of reb-M may be stably maintained in the composition. In another advantageous example, the solvent may be substantially free of 1,2-propanediol (propylene glycol). A solvent that is substantially free of propylene glycol may comprise up to 0%, 1%, 2%, 3%, 4% or 5% by weight of propylene glycol. Preferably, the solvent comprises no propylene glycol. In a preferred aspect, the solvent may be substantially free of both propylene glycol and water.

The quantity of solvent or solvents used in the sweetener composition and/or the particular solvent or solvents may be selected to impart particular properties such as viscosity, density, volatility, boiling point or stability to the sweetener composition. Different applications in the food and beverage industry may, for example, benefit from a different viscosity of sweetener composition depending upon intended use, the method of dispensing, and/or other factors. In an example, the solvent may comprise 1,3-propanediol and glycerol to impart a desired viscosity to the sweetener composition. The viscosity of glycerol is greater than that of 1,3-propanediol and the mixture of solvents that results may be preferential to the viscosity of 1,3-propanediol when used alone. In an example, a solvent may comprise 32% glycerol with viscosity 1.412 Pa·s and 68% 1,3-propanediol with a viscosity of 0.05 Pa·s such that the resultant viscosity is approximately 1 Pa·s. It may be desirous for a sweetener composition that will be poured in use to have a lower viscosity than a sweetener composition to be dispensed via a pump from a reservoir. By adjusting the proportions of 1,3-propanediol and the one or more additional solvents, where present, the viscosity of the sweetener formulation or the other properties of the sweetener may be tailored towards specific applications.

The sweetener composition of the invention may comprise one or more flavourings selected from acerola, almond, apple, beet sugar, berries, brown sugar, caffeine, caja, cane sugar, cashew, cherry, coffee, cola, chocolate, fruit, grape, grapefruit, graviola, guava, hibiscus, horchata, lemon, lemonade, lime, mandarin, mango, melon, orange, banana, papaya, kiwi, passion fruit, peach, pear, pineapple, coconut, seriguela, spice, strawberry, sweet orange, tamarind, tangerine, tea, tea extract, tuna, cactus, fig, vanilla, watermelon, white sugar, any other suitable flavouring or any combination thereof. Preferably, the flavouring may comprise white sugar flavouring, brown sugar flavouring, cane sugar flavouring, beet sugar flavouring, or any combination thereof. Flavourings useful in the liquid sweetener composition of the invention may be liquid flavourings, flavour emulsions and/or powdered flavourings. The flavouring may be dissolved in one or more solvents such as 1,3-propanediol, glycerol, ethanol, benzyl alcohol, medium chain triglycerides such as neobee oil, triacetin, any other suitable solvent and any combination thereof. The flavourings may be in the form of an extract, such as a fruit or plant extract. The flavourings may comprise one or more plant-based oils.

The flavouring may be present in the sweetener composition in a proportion of from 0.1 to 50% by total weight of the composition. In an example, the flavouring may be present in the composition in a proportion of from 0.1 to 40% by total weight of the composition. In another example, the flavouring may be present in the composition in a proportion of from 0.1 to 30% by total weight of the composition. In yet another example, the flavouring may be present in the composition in a proportion of from 5 to 50% by total weight of the composition. In a further example, the flavouring may be present in the composition in a proportion of from 10 to 50% by total weight of the composition. In a yet further example, the flavouring may be present in the composition in a proportion of from 15 to 50% by total weight of the composition. In an additional example, the flavouring may be present in the composition in a proportion of from 20 to 50% by total weight of the composition. In a further additional example, the flavouring may be present in the composition in a proportion of from 15 to 35% by total weight of the composition. In yet another additional example, the flavouring may be present in the composition in a proportion of from 0.1 to 5% by total weight of the composition. In a yet further additional example, the flavouring may be present in the composition in a proportion of from 10 to 35% by total weight of the composition. In general, a lower proportion of flavouring will be required for flavours that are more distinct when present in smaller quantities. For example, vanilla, grape, almond, or cherry may impart their desired flavour at 5% by total weight of composition whereas flavours such as lemon or lime may impart an equivalent level of flavour when present at approximately 10% by total weight of the composition.

The sweetener composition may further comprise one or more additives. For example, the liquid sweetener may comprise one or more preservatives, colourings, vitamins, electrolytes, minerals, herbs, spices, proteins, amino acids, peptides, fortifiers, any other suitable additive or any combination thereof. Preservatives that may be included in the sweetener composition include potassium sorbate, sodium sorbate, citrus extracts, potassium benzoate, sodium benzoate, sodium hexa-meta-phosphate, EDTA, nisin, natamycin, polylysine, any other suitable preservative or any combination thereof. Alternatively, in an advantageous example, the sweetener composition may be substantially free of preservatives. A sweetener composition that is substantially free of preservatives may comprise up to 0%, 1%, 2%, 3%, 4% or 5% by weight of preservative. Preferably, the composition comprises no preservative. In a particular aspect, the composition may be substantially free of preservatives, propylene glycol and water. In examples where the sweetener is substantially free of water, the sweetener formulation may be stable for an extended period of time without the use of preservatives due to the antimicrobial and antibacterial properties of 1,3-propanediol. As the composition of this example is substantially free of water, no preservative is required as microbial growth is inhibited by both the properties of 1,3-propanediol and the absence of available water.

The individual ingredients such as the active sweetening agent, solvent or liquid base and optional additional components may be produced by synthetic or natural processes. Preferably, each ingredient in the sweetener composition is produced by natural processes.

The sweetener compositions may be prepared by a process comprising adding the active sweetening agent to the solvent to form a mixture and heating the mixture of the active sweetener agent and the solvent to form a liquid sweetener composition. The sweetener composition may be cooled to room temperature via natural cooling or via cooling processes such as placing the sweetener composition in an ice bath or temperature controlled environment. One or more flavourings, where desired, may be added to the solvent before or after the addition of the active sweetener agent. When the one of more flavourings are added to the solvent after the addition of the active sweetening agent, the one of more flavourings may be added before or after the mixture of solvent and active sweetening agent is heated. Many flavourings may volatilise or degrade at high temperatures and so it may be advantageous to add the one or more flavourings after the active sweetening agent has been dissolved in the solvent and the resultant sweetener composition has cooled to room temperature. Optional additives, where present, may be added to the solvent or sweetener composition at any point suitable for the addition of the one or more flavourings. The solvent and/or sweetener composition may optionally be stirred, mixed, or otherwise agitated at any or all parts of the process to promote dissolution and/or uniform distribution of ingredients throughout the composition.

The heating process may heat the solvent and/or active sweetening agent to a temperature of from 30 to 150° C. In an example, the solvent and/or active sweetening agent may be heated to a temperature of from 40 to 120° C. In another example, the solvent and/or active sweetening agent may be heated to a temperature of from 50 to 100° C. In yet another example, the solvent and/or active sweetening agent may be heated to a temperature of from 70 to 80° C. In a further example, the solvent and/or active sweetening agent may be heated to a temperature of from 40 to 50° C. In another further example, the solvent and/or active sweetening agent may be heated to a temperature of from 60 to 70° C. The heating may be carried out using a microwave heating device, a heated jacketed device, direct flame heating devices, electrical heating devices or any suitable heating device. The temperature to which the solvent and active sweetening agent are heated may be adjusted to promote dissolution of the active sweetening agent into the solvent and/or to prevent loss or degradation or one or more ingredients present at the time of heating.

In use, the liquid sweetener composition of the present invention may be used to provide sweetness to any product for ingestion. The liquid sweetener composition may additionally or alternatively be ingested directly without addition of the liquid sweetener composition to an item to be ingested. In an example, the liquid sweetener composition may be used to sweeten items of food or beverage. In another example, the liquid sweetener formulation may be used to sweeten one or more medicines. The liquid sweetener composition may be added to an item of food, beverage or medicine during its process of preparation or manufacture. Additionally, or alternatively, the liquid sweetener formulation may be added to an item of food, beverage or medicine by an end user prior to consumption. The liquid sweetener composition may be stored in one or more containers for storage. The container in which the liquid sweetener composition may be stored may be air and/or water tight when sealed and may be optically transparent, optically opaque, or allow any amount of light to pass into the container as desired. When use of the liquid sweetener composition is desired, the composition may be dispensed from a container containing the composition by pouring, squeezing, pumping or any other suitable dispensing means. In an example, a container may have a hand operated pump which, when operated by the user, will dispense a predetermined quantity of the liquid sweetener composition for the user. In another example, the container in which the liquid sweetener composition is contained may be squeezable such that individual drops of the liquid sweetener composition are dispensed from the container.

The concentration of the active sweetening agent may be selected such that, in use, a user may add a defined volume or number of drops to a beverage to provide a desired level of sweetness. For example, a user may dispense 1, 2, 3, 4, 5, 6, 7, 8, 9, 10, or more drops into a beverage as desired. In a particular example, a user may dispense exactly 3 drops of the liquid sweetener composition into a beverage. In another example, a user may dispense exactly 4 drops of the liquid sweetener composition into a beverage. In yet another example, a user may dispense exactly 5 drops of the liquid sweetener composition into a beverage. Preferably, the liquid sweetener composition may be formulated such that the user dispenses 4 drops of the liquid sweetener formulation to provide a food or beverage item with a desired sweetness. 4 drops strikes an advantageous balance between ease of use and the risk of over or under sweetening a food or beverage item when the user dispenses the liquid sweetener formulation with an error margin of ±1 drop. For the avoidance of doubt, a drop is equivalent to $1/20^{th}$ of a millilitre (1 ml) or 0.05 ml. In another example where the sweetener composition is to be dispensed using a container fitted with a hand pump, the hand pump may be configured to dispense up to 1, 2, 3, 4, 5, 6, 7, 8, 9, 10 or more millilitres of sweetener composition into a beverage. The container and pump may be configured such that a predetermined quantity of sweetener composition is dispensed into a user's beverage. The active sweetening agent, the concentration of the active sweetening agent and the volume of sweetener composition dispensed by the pump may each be selected to impart a desired level of sweetness to a particular volume of beverage. For example, the volume of the sweetener composition dispensed may be selected to impart a desired sweetness to a 235 ml beverage (8 US fluid ounces), a 355 ml beverage (12 US fluid ounces), a 475 ml beverage (16 US fluid ounces), or any other desired volume of beverage.

The liquid sweetener composition may be formulated such that the quantity of the composition required to impart a desired level of sweetness to an item to be ingested contains less than 5 calories per serving. Additionally, or alternatively, the liquid sweetener composition may be formulated such that the composition contains less than 4 calories per 100 ml of the composition.

The liquid sweetener composition may be stable at room temperature for a period of 1 or more years. In an example, the liquid sweetener composition of the invention may be stable at room temperature for a period of 2 or more years. In yet another example, the liquid sweetener composition may be stable in excess of three years at room temperature. The long term stability of the liquid sweetener composition may be increased where the liquid sweetener composition is substantially free of water and/or comprises one or more preservatives.

The following examples are provided in support of the present disclosure and are not intended to limit the scope of the invention.

Example 1

4 g of reb-M powder (≥95%) was added to a 125 ml Erlenmeyer flask. 40 g of 1,3-propanediol liquid (≥99.8%) was added to the flask and the flask contents were stirred to distribute the reb-M powder throughout the 1,3-propanediol. The flask was stirred for 24 hours at room temperature (estimated 23° C.). The contents of the flask were filtered and a quantity of 3.8 g solid was recovered on the filter paper. The filtrate density was 1.06 g/ml.

Example 2

2.5 g of reb-M powder (≥95%) was added to a 125 ml Erlenmeyer flask. 23.2 g of 1,3-propanediol liquid (≥99.8%) was added to the flask and the flask contents were stirred to distribute the reb-M powder throughout the 1,3-propanediol. The flask was placed in a microwave heating oven (1800 watts, Whirlpool Corp, Model: WMH 73521CS-6) for a period of 15 seconds until the contents of the flask reached approximately 70 to 80° C. The contents of the flask were stirred while hot until a clear solution free of solids was obtained. The solution was cooled in an ice bath to room temperature (estimated 23° C.). No precipitation of solid was observed during or after cooling of the solution.

Following cooling, 10 g of white sugar flavouring was added to the flask and the contents mixed to obtain a clear solution of a uniform consistency with a density of 1.07 g/ml.

Example 3

4.9 g of reb-M powder (≥95%) was added to a 125 ml Erlenmeyer flask. 6.5 g of 1,3-propanediol liquid (≥99.8%) was added to the flask and the flask contents were stirred to distribute the reb-M powder throughout the 1,3-propanediol. The flask was placed in a microwave heating oven (1800 watts, Whirlpool Corp, Model: WMH 73521CS-6) for a period of 15 seconds until the contents of the flask reached approximately 70 to 80° C. The contents of the flask were stirred while hot until a clear solution free of solids was obtained. The solution was cooled in an ice bath to room temperature (estimated 23° C.). No precipitation of solid was observed during or after cooling of the solution.

Following cooling, 9 g of white sugar flavouring was added to the flask and the contents mixed to obtain a clear solution of a uniform consistency with a density of 1.87 g/ml.

Example 4

0.006 g of reb-M powder (≥95%) was added to a 125 ml Erlenmeyer flask. 32 g of 1,3-propanediol liquid (≥99.8%) was added to the flask and the flask contents were stirred to distribute the reb-M powder throughout the 1,3-propanediol. The flask was placed in a microwave heating oven (1800 watts, Whirlpool Corp, Model: WMH 73521CS-6) for a period of 10 seconds until the contents of the flask reached approximately 70 to 80° C. The contents of the flask were stirred while hot until a clear solution free of solids was obtained. The solution was cooled in an ice bath to room temperature (estimated 23° C.). No precipitation of solid was observed during or after cooling of the solution.

The solution was found to possess a sweet taste upon the palate.

Following cooling, 9 grams of white sugar flavouring was added to the flask and the contents mixed to obtain a clear solution of a consistent consistency with a density of 1.35 g/ml.

Example 5

2.2 g of reb-M powder was added to a 125 ml Erlenmeyer flask. 30 g of 1,3-propanediol liquid (≥99.8%) was added to the flask and the flask contents were stirred to distribute the reb-M powder throughout the 1,3-propanediol. The flask was placed in a microwave heating oven (1800 watts, Whirlpool Corp, Model: WMH 73521CS-6) for a period of 10 seconds until the contents of the flask reached approximately 50 to 60° C. The contents of the flask were stirred while hot until a clear solution free of solids was obtained. The solution was cooled in an ice bath to room temperature (estimated 23° C.). No precipitation of solid was observed during or after cooling of the solution.

Following cooling, 2 grams of brown sugar flavouring was added to the flask and the contents mixed to obtain a clear solution of a uniform consistency with a density of 1.21 g/ml.

Example 6

3.3 g of reb-M powder was added to a 125 ml Erlenmeyer flask. 37 g of 1,3-propanediol liquid (≥99.8%) was added to the flask and the flask contents were stirred to distribute the reb-M powder throughout the 1,3-propanediol. The flask was placed in a microwave heating oven (1800 watts, Whirlpool Corp, Model: WMH 73521CS-6) for a period of 10 seconds until the contents of the flask reached approximately 50 to 60° C. The contents of the flask were stirred while hot until a clear solution free of solids was obtained. The solution was cooled in an ice bath to room temperature (estimated 23° C.). No precipitation of solid was observed during or after cooling of the solution.

No flavouring was added to the flask. The resulting solution had a uniform consistency with a density of 1.15 g/ml.

Example 7

2.5 g of reb-M powder (≥95%) was added to a 125 ml Erlenmeyer flask. 18.2 g of 1,3-propanediol liquid (≥99.8%) and 12.1 g glycerol (≥99%) was added to the flask and the flask contents were stirred to distribute the reb-M powder throughout the solvents. The flask was placed in a microwave heating oven (1800 watts, Whirlpool Corp, Model: WMH 73521CS-6) for a period of 15 seconds until the contents of the flask reached approximately 70 to 80° C. The contents of the flask were stirred while hot until a clear solution free of solids was obtained. The solution was cooled in an ice bath to room temperature (estimated 23° C.). No precipitation of solid was observed during or after cooling of the solution.

Following cooling, 10 grams of cane sugar flavouring was added to the flask and the contents mixed to obtain a clear solution of a uniform consistency with a density of 1.53 g/ml.

Example 8

2.0 g of reb-M powder (≥95%) and 1.5 g reb-A powder was added to a 125 ml Erlenmeyer flask. 28.8 g of 1,3-propanediol liquid (≥99.8%) was added to the flask and the flask contents were stirred to distribute the reb-M and reb-A powders throughout the 1,3-propanediol. The flask was placed in a microwave heating oven (1800 watts, Whirlpool Corp, Model: WMH 73521CS-6) for a period of 15 seconds until the contents of the flask reached approximately 70 to 80° C. The contents of the flask were stirred while hot until a clear solution free of solids was obtained. The solution was cooled in an ice bath to room temperature (estimated 23° C.). No precipitation of solid was observed during or after cooling of the solution.

Following cooling, 10 grams of brown sugar flavouring was added to the flask and the contents mixed to obtain a clear solution of a uniform consistency with a density of 1.50 g/ml.

Additional Disclosure

The following is provided as additional disclosure for combinations of features and aspects of the present invention.

A first aspect, which is a composition comprising rebaudioside-M and 1,3-propanediol.

A second aspect, which is the composition of the first aspect, the composition further comprising one or more flavorings.

A third aspect, which is the composition of the second aspect, wherein the flavouring is selected from the group comprising white sugar flavouring, brown sugar flavouring, cane sugar flavouring, beet sugar flavouring, or any combination thereof.

A fourth aspect, which is the composition of any of the first through the third aspects, wherein the composition comprises one or more additional steviol glycosides.

A fifth aspect, which is the composition of any of the first through the third aspects, wherein the composition is substantially free of sweetening agents other than rebaudioside-M.

A sixth aspect, which is the composition of any of the first through the fifth aspects, wherein the composition is substantially free of water.

A seventh aspect, which is the composition of any of the first through the sixth aspects, wherein the composition is substantially free of propylene glycol.

An eighth aspect, which is the composition of any of the first through the seventh aspects, wherein the composition further comprises glycerol.

A ninth aspect, which is the composition of any of the first through the eighth aspects, wherein the composition comprises 25% to 99.5% 1,3-propanediol, and 0.5% to 75% rebaudioside-M, by weight of the total composition.

A tenth aspect, which is the composition of any of the first through the ninth aspects, wherein the composition comprises 20% to 85% 1,3-propanediol, 0.5% to 75% rebaudioside-M, and 5% to 35% flavouring, by weight of the total composition.

An eleventh aspect, which is a process for the preparation of a composition, the process comprising adding rebaudioside-M to 1,3-propanediol to form a mixture, heating the mixture of rebaudioside-M to 1,3-propanediol to form a solution of rebaudioside-M, and cooling the solution of rebaudioside-M.

A twelfth aspect, which is the process of the eleventh aspect, the process further comprising adding one or more flavourings to the solution of rebaudioside-M, and optionally mixing the solution of rebaudioside-M and the flavouring.

A thirteenth aspect, which is the process of the twelfth aspect, wherein the adding of one or more flavourings of to the solution of rebaudioside-M is performed after the solution of rebaudioside-M has cooled.

A fourteenth aspect, which is the process of any of the eleventh through the thirteenth aspects, wherein the mixture of rebaudioside-M is heated to a temperature of 50 to 120° C.

A fifteenth aspect, which is the process comprising utilizing the composition of any of the first through the tenth aspects as a sweetener in food or beverage.

While embodiments of the disclosure have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention.

At least one aspect or embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, 5, 6, . . . ; greater than 0.10 includes 0.11, 0.12, 0.13, 0.14, 0.15, . . . ). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of.

Accordingly, the scope of protection is not limited by the description set out above but is only limited by the claims which follow, that scope including all equivalents of the subject matter of the claims. Each and every claim is incorporated into the specification as an aspect of the present invention. Thus, the claims are a further description and are an addition to the detailed description of the present invention.

What is claimed is:

1. A liquid sweetener comprising rebaudioside-M and 1,3 propanediol, wherein the liquid sweetener does not comprise water and propylene glycol.

2. The liquid sweetener as claimed in claim 1, the liquid sweetener further comprising one or more flavourings.

3. The liquid sweetener as claimed in claim 2, wherein the one or more flavourings are selected from the group comprising white sugar flavouring, brown sugar flavouring, cane sugar flavouring, beet sugar flavouring, and any combination thereof.

4. The liquid sweetener as claimed in claim 1, wherein the liquid sweetener comprises one or more steviol glycosides.

5. The liquid sweetener as claimed in claim 1, wherein the liquid sweetener is substantially free of sweetening agents other than rebaudioside-M.

6. The liquid sweetener as claimed in claim 1, wherein the liquid sweetener further comprises glycerol.

7. The liquid sweetener as claimed in claim 1, wherein the liquid sweetener comprises:
    25% to 99.5% 1,3-propanediol; and
    0.5% to 75% rebaudioside-M, by weight of the liquid sweetener as a whole.

8. The liquid sweetener as claimed in claim 1, wherein the liquid sweetener comprises:
    20% to 85% 1,3-propanediol;
    0.5% to 75% rebaudioside-M; and
    5% to 35% flavouring, by weight of the liquid sweetener as a whole.

9. A composition comprising rebaudioside-M and 1,3-propanediol, wherein the composition does not comprise water and propylene glycol, wherein the composition is prepared by a process comprising:
    adding rebaudioside-M to 1,3-propanediol to form a mixture;
    heating the mixture of rebaudioside-M and 1,3-propanediol to form a solution of rebaudioside-M; and
    cooling the solution of rebaudioside-M.

10. The composition of claim 9, further comprising one or more flavourings, wherein the process further comprises adding the one or more flavouring to the solution of rebaudioside-M.

11. The composition of claim 10, wherein the adding of one or more flavourings to the solution of rebaudioside-M is performed after the solution of rebaudioside-M has cooled.

12. The composition of claim 9, further comprising one or more flavourings, wherein the process further comprises adding the one or more flavourings to the solution of rebaudioside-M, and mixing the solution of rebaudioside-M and the one or more flavourings.

13. The composition of claim 12, wherein the adding of the one or more flavourings to the solution of rebaudioside-M is performed after the solution of rebaudioside-M has cooled.

14. The composition of claim 9, wherein the mixture of rebaudioside-M and 1,3-propanediol is heated to a temperature of 50 to 120 degrees.

15. A composition for sweetening a food or a beverage, the composition comprising rebaudioside-M and 1,3-propanediol, wherein the composition is a liquid suspension that does not comprise water and propylene glycol.

* * * * *